United States Patent [19]

Russ

[11] Patent Number: 4,570,984
[45] Date of Patent: Feb. 18, 1986

[54] DOOR HOLD

[76] Inventor: Norman Russ, Box 508, Norwich, Conn. 06360

[21] Appl. No.: 523,446

[22] Filed: Aug. 15, 1983

[51] Int. Cl.⁴ .......................... E05C 9/02; E05C 5/00
[52] U.S. Cl. ........................................ 292/18; 292/71; 292/DIG. 15
[58] Field of Search ................... 292/16, 18, 71, 74, 292/78, 338, DIG. 4, DIG. 15; 16/82, 86

[56] References Cited

U.S. PATENT DOCUMENTS 1,048,989 12/1912 McDonnell .......................... 292/18
1,214,018 1/1917 Vleeschouwer et al. .... 292/DIG. 4 X

FOREIGN PATENT DOCUMENTS 942494 5/1956 Fed. Rep. of Germany ... 292/DIG. 15
229181 8/1963 Fed. Rep. of Germany ... 292/DIG. 15 X
113515 1/1926 Switzerland ................ 292/DIG. 19

Primary Examiner—Kenneth J. Dorner
Assistant Examiner—Russell W. Illich
Attorney, Agent, or Firm—McCormick, Paulding & Huber

[57] ABSTRACT

A mostly automatic device designed to hold open a common interior or exterior door simply by swinging the door until it strikes a small spring-loaded lever which moves in a linear mode, allowing the door to pass by said lever and to contact a larger lever with its own spring which is required to securely hold the door's edge, said small lever also assisting in holding the door trapped within the confines of both levers until such time as the door is pulled forward, this action releasing it from the pressure of the larger lever, and at the same moment causing the smaller lever to rotate and permit the door to pass by it, thus allowing the door to be freed of its formerly confined condition.

1 Claim, 6 Drawing Figures

DOOR HOLD

This invention relates generally to means for holding a conventional door in an open condition as for example against a wall or the like, and serves to prevent the door from being inadvertently closed as for example by a sudden gust of wind or the like. In operation the device functions in a semi-automatic fashion requiring only contact by the door during opening to lock or to release the mechanism.

In its presently preferred form the door holder of the present invention includes a base attached to the floor adjacent the path of movement of the door during opening. A first lever is pivotally received in the base for limited movement toward an extended position wherein a free end of the lever serves to stop door opening movement beyond a predetermined door position. A spring urges this first lever toward this extended position. A second lever is movably mounted with respect to the base between an extended position wherein the door is trapped between it and the first lever and a retracted position wherein the door is allowed to move into its predetermined position past said second lever by camming the second lever toward its retracted position. The second lever is also movable to a third position wherein the door can move toward its closed position and past the second lever. Spring biasing means urges the second lever toward its extended position. A pivot post is common to both levers and the second lever has a slot defined in it for slidably receiving this pivot post. Slidably motion of the second lever relative to the base is provided for in addition to pivotal motion and the base has at least one stop to restrict the second lever to pivotal motion only between first and second positions.

Figure 2:
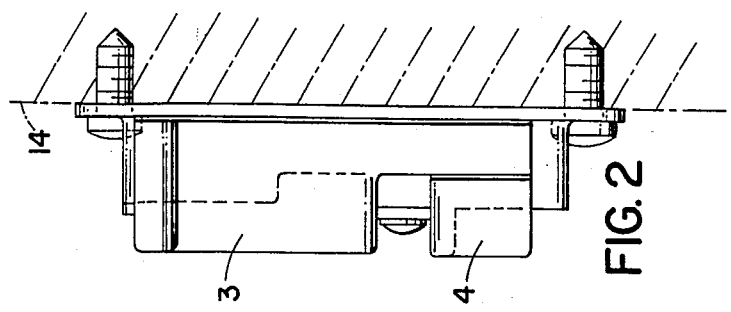
FIG. 2 is an elevational view taken from the front of the door holder of FIG. 1.
Figure 1:
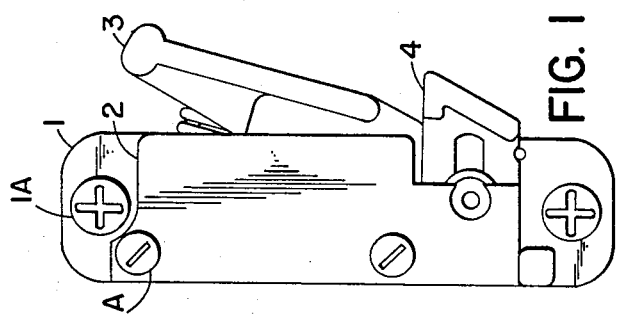
FIG. 1 is a plan view of a door holder incorporating the present invention.

Turning now to the drawings in greater detail, and referring particularly to FIG. 1, the door holder of the present invention is there illustrated with the first or primary lever 3 in a normal condition and with the second or secondary lever 4 also in a normal position. Both levers are provided pivotably in a base 1 and more particularly on a pivot post or stud 9 best shown in FIG. 4. The door 12 is illustrated in phantom lines in FIGS. 3, 5 and 6 and may have a wear plate 11 provided on its edges for purposes of engaging the levers of the door holder described herein. Primary or first lever 3 is engaged by a spring 5 acting between the base and the lever so as to urge the lever from the deflected position illustrated for it in FIG. 3 to the relaxed or normal position illustrated in FIG. 1.

Figure 5:
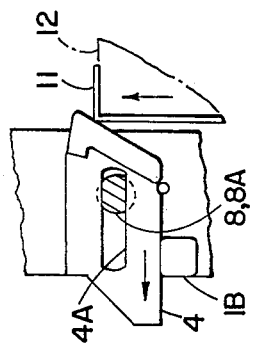
FIG. 5 is a plan view of a portion of the mechanism illustrated in FIGS. 1-4 showing the swinging door as it strikes the second lever during opening movement.

Secondary or second lever 4 is acted upon by torsion spring 7 such that it is urged toward the position shown for it in FIG. 1, but can be moved from that position generally toward the left as shown in FIG. 5 by the door 12 as it moves in the direction of the arrow indicated in that view. Secondary lever 4 moves in the direction of the arrow indicted in FIG. 5 as a result of door opening movement. Still with reference to the secondary lever 4 it will be apparent from FIG. 6 that after the door has been secured in the position shown for it in FIG. 3 that door 12 can be moved downwardly in the direction of the arrow shown in FIG. 6 as a result of which lever 4 pivots in the clockwise direction indicated for it in this view and lever 4 has an elongated slot provided therein so as to permit both sliding and pivotal motion of this lever in the door holder of the present invention. Base 1 has a post 1B defined therein for purposes of limiting pivotal motion of the lever 4 all in accordance with the present invention.

Figure 3:
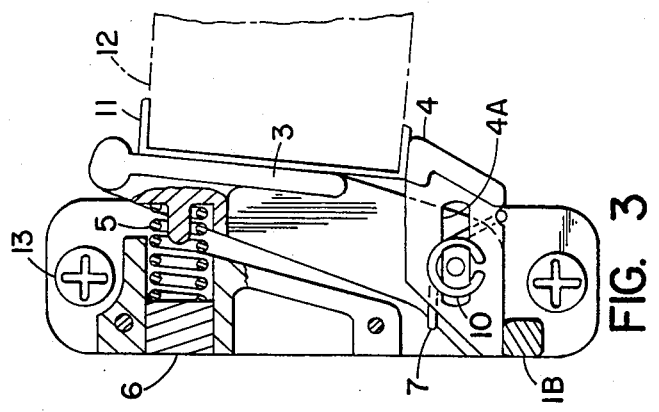
FIG. 3 is a view similar to FIG. 1 but with portions illustrated in partial section to better illustrate internal parts.
Figure 6:
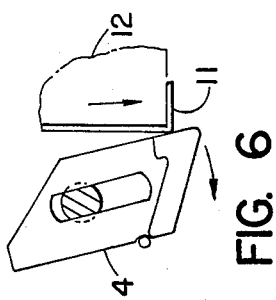
FIG. 6 is a view similar to FIG. 5 but showing the door in the process of being released from the door holder and more particularly moving in the opposite or closing direction.
Figure 4:
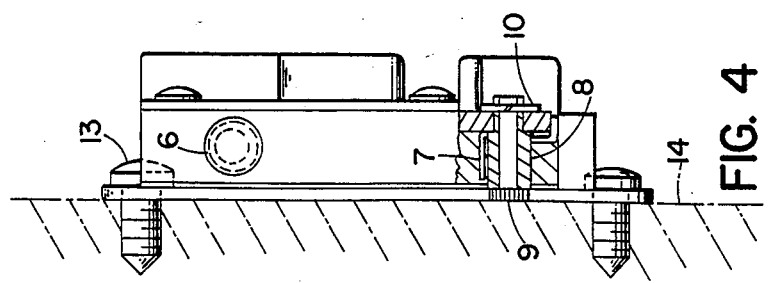
FIG. 4 is a elevational view also partially in section illustrating the rear side of the door holder of the present invention.

As so constructed and arranged the base 1 can be attached to a surface such as the floor 14 by screws 13, 13 so as to be provided in the path of movement of the edge of a conventional door in order to releasably secure the door in an open condition relative to a doorway (not shown) all as suggested in FIG. 3. In this position the free end of the lever 3 serves to stop door opening movement beyond a predetermined position. Spring 5 acts on the lever to urge the lever towards its normal extended position as suggested in FIG. 1. The second lever 4 is also movably mounted in the base between an extended position as shown in FIGS. 1 and 3 wherein the doors can be trapped between it and the first lever. This secondary lever also has a retracted position (as shown in FIG. 5) wherein the door can move in a door open direction relative to the door frame and more particularly into the predetermined position illustrated for it in FIG. 3 past this second lever by camming the second lever toward the retracted position illustrated for it in FIG. 5. The second lever is also movable to a third position as best shown in FIG. 6 wherein the door is adapted to move toward its closed direction relative to the door way (not shown) that is past the second lever and away from the door holder itself. Both levers are provided on a common pivot post and the second lever is provided with a slot for slidably receiving this pivot post in order to provide for both sliding movement of the second lever relative to the base and pivotal motion relative thereto. The base preferably includes at least one stop in the form of post 1B to restrict the second lever to pivotal motion only between its first and second positions as described above.

What is claimed is:

1. A door holder comprising a base adapted for attachment to a floor adjacent the path of movement for the door during door opening movement, a first lever pivotally received in said base for limited movement toward an extended position wherein a free end of the said lever serves to stop door opening movement beyond a predetermined door position, a spring to urge said first lever toward said extended position, a second lever movably mounted with respect to said base between an extended position wherein the door is trapped between it and said first lever and a retracted position wherein the door can move into said predetermined position past said second lever by camming said second lever toward said retracted position, said second lever also movable to a third position wherein the door can move toward its closed position and past said second lever, spring biasing means to urge said second lever toward said extended position, a common pivot post for both levers, said second lever having a slot defined therein for slidably receiving said pivot post and providing for slidable motion of said second lever relative said base in addition to the pivotal motion thereof relative said base, and said base having at least one stop to restrict said second lever to pivotal motion only between said first and second positions thereof.

* * * * *